United States Patent [19] [11] Patent Number: 4,495,687

Sieveking [45] Date of Patent: Jan. 29, 1985

[54] HOLLOW METAL DOOR MORTISER AND METHOD OF USING SAME

[76] Inventor: Robert Sieveking, 1211 4th Ave., Rockford, Ill. 61104

[21] Appl. No.: 386,720

[22] Filed: Jun. 9, 1982

[51] Int. Cl.[3] ........................ B23P 19/00; B21D 9/05; B21D 31/00

[52] U.S. Cl. ................................ 29/426.1; 29/526 R; 72/390; 72/454; 52/214; 292/216

[58] Field of Search .............. 29/155 R, 526 R, 426.1; 72/390, 391, 453, 17, 414, 412, 454, 416, 472, 432; 52/211, 213, 214, 217; 292/216, 280

[56] References Cited

U.S. PATENT DOCUMENTS

| | | | |
|---|---|---|---|
| 507,892 | 10/1893 | Dyson, Jr. | 72/472 X |
| 2,292,446 | 8/1942 | Huck | 72/412 X |
| 2,363,931 | 11/1944 | Beard | 72/412 |
| 2,423,957 | 7/1947 | Amtsberg | 72/453.17 X |
| 3,265,427 | 8/1966 | Williams | 52/214 X |
| 3,289,454 | 12/1966 | Chandler | 72/414 X |

*Primary Examiner*—Charlie T. Moon
*Attorney, Agent, or Firm*—Laff, Whitesel, Conte & Saret

[57] ABSTRACT

A mortiser device and method for applying a mortise or offset in the edge of a hollow metal door where a dead bolt or other latch is to be installed. The method and device comprises a die block adapted to be positioned inside of the door edge at a point adjacent where a mortise is to be formed in the door edge, a cavity in the die block, a mortising block operatively connected to the die block by a pressure application device, whereby the mortising block is disposed on the outer side of the door edge adjacent the die block and a portion of the door edge extends between the die block and the mortising block. The pressure application device extends between the die block and the mortising block through the aperture in the door edge, and the pressure application device is adapted to press the mortising block and the portion of the door edge extending between the die block and the mortising block into the cavity in the die block to form an offset in the door edge.

10 Claims, 12 Drawing Figures

HOLLOW METAL DOOR MORTISER AND METHOD OF USING SAME

TECHNICAL FIELD

The present invention relates to a device for easily and rapidly creating a mortise in a hollow metal door in which a dead bolt or other type of latch is to be installed. More particularly, the present invention relates to a pressure tool which can be hand operated to create a mortise in a hollow metal door.

BACKGROUND ART

In the past few years, there has been a marked increase in the use of hollow metal doors in the building construction industry, compared to the use of traditional wooden doors. Also, as property owners become increasingly interested in security, the use of key-latch dead bolt locks in addition to regular door latches has also been on the increase. The task of installing a dead bolt lock in a hollow metal door has previously been a time consuming project, primarily due to the effort required to create a mortise in the edge of the door.

The mortise is an indented or offset portion on the edge of a door where a face plate is installed adjacent a bolt latch device. The bolt portion of the dead bolt assembly passes thorugh an aperture in the center of the face plate. The face plate must be installed so that its outer surface is flush with the edge of the door, whereby the door can open and close without interfering with the door jamb. The purpose of the mortise is to provide an indented or offset portion on the edge of the door for locating and receiving the dead bolt face plate.

One present state-of-the-art method of creating a mortise in a hollow metal door consists of cutting a square aperture in the door edge and using a metal bridge or wooden block to span the aperture. The dead bolt is then fastened on the bridge or block in the edge of the door. However, this solution has not produced professional-looking workmanship. The square aperture must be hewn out with a chisel, which leaves rough, unfinished edges around the aperture. In addition, a square hole in the door edge weakens the structural integrity of the door. Also, use of a chisel, saw and metal cutting wheel to cut the square aparture in the edge of the door is very time consuming, and increases the cost of installing dead bolt latches in hollow steel doors.

Other than the chisel-bridge system mentioned above for forming a mortise in a hollow metal door, the prior art is void of any easy-to-operate mechanism or tool which will easily and quickly produce a professional looking mortise. The relevant prior art consists of metal bending and joggling systems which form offsets in sheet metal structures, but there is no teaching of applying such systems to form mortises in hollow metal doors. Examples of such metal forming systems are found in U.S. Pat. Nos. 2,292,446; 2,363,931; and 3,289,454. U.S. Pat. No. 2,292,446 discloses a hand operated tool for dimpling and riveting sheet metal covers to airplanes, and does not disclose how a mortise could be applied to a hollow metal door. U.S. Pat. Nos. 2,363,931 and 3,289,454 disclose joggling tools for placing an offset in a sheet metal article. Neither of these patents disclose a device for creating a mortise in the edge of a hollow metal door.

As will be described in greater detail hereinafter, the present invention is adapted to allow a locksmith, or any other craftsman, to easily create a mortise in a hollow metal door to facilitate installation of a dead bolt latch.

SUMMARY OF THE INVENTION

The present invention relates to a mortiser device for applying a mortise to the edge of a hollow metal door comprising a die block adapted to be positioned inside of the door edge at a point adjacent where a mortise is to be formed in the door edge, a cavity in the die block, a mortising block operatively connected to the die block by a pressure application device, the mortising block disposed on the outer side of the door edge adjacent the die block, whereby a portion of the door edge extends between the die block and the mortising block, the pressure application device extending between the die block and the mortising block through the aperture in the door edge, the pressure application device adapted to force the mortising block and the portion of the door edge extending between the die block and the mortising block into the cavity in the die block to form an offset in the door edge.

The present invention also relates to a method of applying a mortise to the edge panel of a hollow door having two spaced apart parallel panels adjacent the edge panel, the hollow door also comprising an opening therein for location of an entry lockset, whereby the method comprises the steps of forming a first hole in the door edge at the location where the mortise is to be formed; forming second and third holes in the two spaced apart parallel panels adjacent the first hole; removing the entry lockset from the door; inserting a die block having a cavity in one face thereof through the opening from which the entry lockset was removed; positioning the die block in the door behind the first hole whereby the door edge adjacent the first hole is positioned over the cavity in the die block; inserting a pressure application device through the first hole and attaching the pressure application device to the die block, the pressure application device including a mortising block extending along the portion of the door edge where the mortise is to be applied; and applying pressure to the mortising block by means of the pressure application device whereby the mortising block and the portion of the door edge extending along the mortising block is pressed into the cavity of the die block, whereby an offset is formed in the door edge.

BEST MODE FOR CARRYING OUT THE INVENTION

Figure 1:
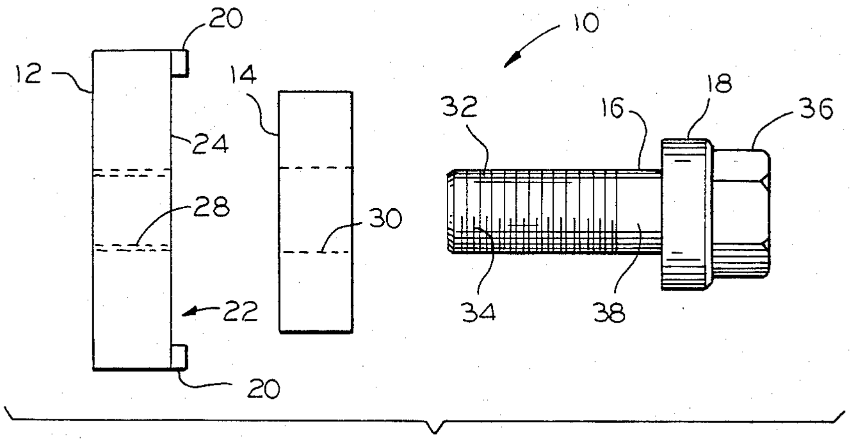
FIG. 1 is an exploded view of the elements comprising my novel mortising tool.

Referring to FIG. 1, there is illustrated in exploded form the elements of the mortising tool of the present invention, generally designated by the numeral 10. The mortising tool 10 includes a die block 12, a mortising block 14, a threaded pressure application bolt 16, and a thrust bearing 18.

Figure 2:
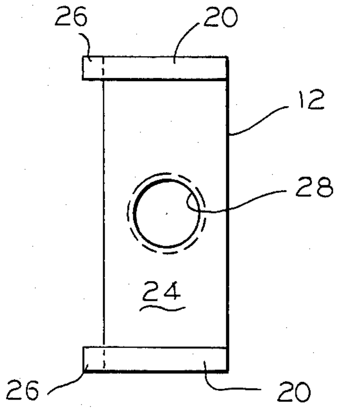
FIG. 2 is a top plan view of the die block of the mortising tool of FIG. 1.
Figure 4:
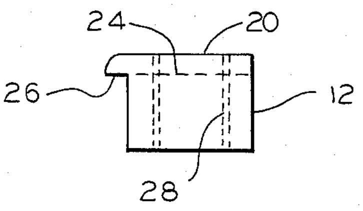
FIG. 4 is a side elevation view of the die block illustrated in FIG. 2.

Die block 12 (FIGS. 1, 2, 4) is a substantially rectangular block of steel, metal or similar hard material and includes a pair of raised edges 20 on either end of the block, to form a cavity 22 between the raised edges 20 and surface 24 of die block 12. Also, the raised edges 20 include lateral protuberances 26 extending on one side of the die block 12. Protuberances 26 form spacing bars for purposes to be described hereinafter. A threaded aperture 28 extends through die block 12, and is adopted to mate with threads on pressure application bolt 16.

Figure 3:
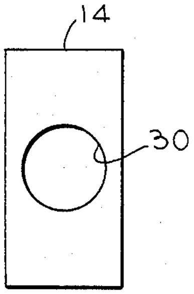
FIG. 3 is a top plan view of the mortising block of the device disclosed in FIG. 1.
Figure 5:
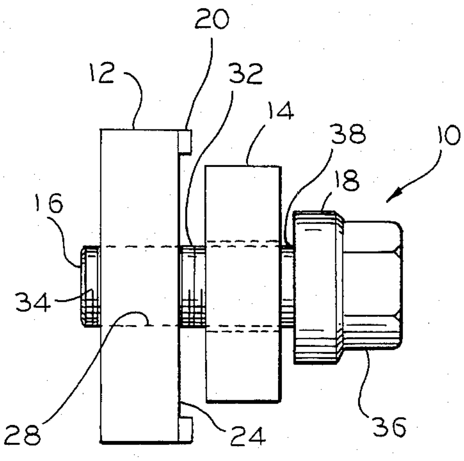
FIG. 5 is a side assembly view of the mortiser of the present invention, showing the relation of the parts when assembled on the threaded pressure application bolt.

Mortising block 14 (FIGS. 1, 3) is a substantially rectangular block preferably made of steel, metal, or other hard material, and includes a straight bore aperture 30 extending through the block. The diameter of aperture 30 is slightly larger than the outside diameter of the shank 32 of pressure application bolt 16, whereby mortising block 14 is free to ride laterally along the shank 32 of pressure application bolt 16 (FIG. 5). The longitudinal dimension of mortising block 14 is such that it is substantially equal to the internal distance between raised edges 20 of die block 12, less twice the thickness of the average piece of sheet metal stock used in ordinary hollow metal doors. This is to enable the mortising block 14 to apply an offset in the edge of a hollow metal door by forcing the metal edge of the door extending between mortising block 14 and die block 12 into cavity 22, as will be explained.

Pressure application bolt 16 comprises shank 32 which includes threads 34 approximately two-thirds along the length of shank 32. Threads 34 are dimensioned so as to engage the threads in aperture 28 of die block 12, whereby rotation of pressure application bolt 16 will cause bolt 16 to move through aperture 28, and move die block 12 towards cavity 22 in die block 12. At one end of pressure application bolt 16 is a shaped head 36, such as a hexagonal head, whereby a wrench or similarly suitable tool can be applied to rotate pressure application bolt 16.

Mounted for free rotation about the unthreaded portion 38 of bolt 16 is a thrust bearing 18 which is adapted to engage the underside of head 36 and one side of mortising block 14 when the device of the present invention is utilized, as will be explained in more detail.

FIG. 5 illustrates how the device of the present invention appears when it would be sold or packaged. Pressure application bolt 16 is threaded into aperture 28 of die block 12, with mortising block 14 and thrust bearing 18 disposed in a non-threaded relation on shank 32 of bolt 16.

Figure 6:
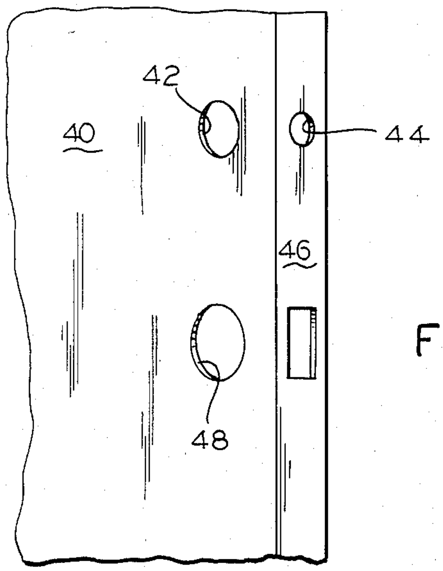
FIG. 6 is a partial cut-away perspective view of a hollow metal door in which a dead bolt latch is to be installed, showing the holes formed in the door for locating the standard entry latch mechanism, and for locating the dead bolt latch above the standard entry latch mechanism locating holes.
Figure 8:
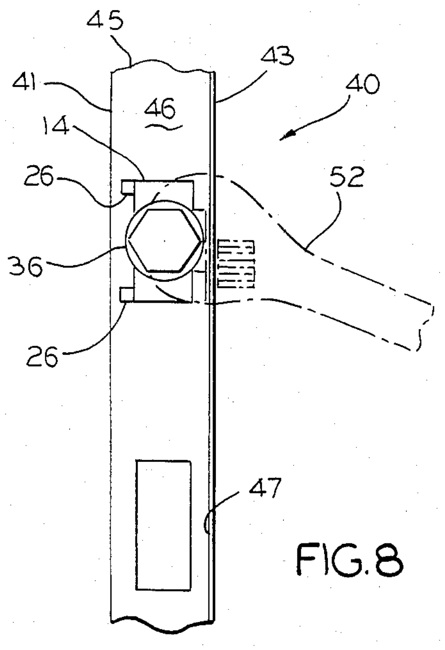
FIG. 8 is an edge view of the hollow metal door in which the mortise is to be installed, showing how the threaded pressure application bolt is tightened into the die block element.
Figure 12:
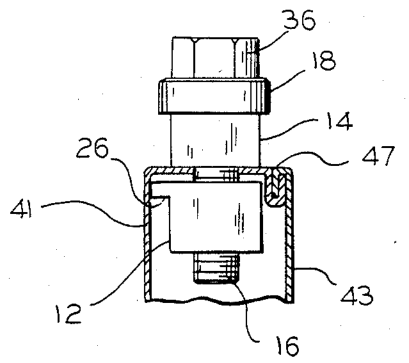
FIG. 12 is a partial detail view of the mortiser of the present invention shown positioned inside a hollow metal door, taken along the line A—A in FIG. 8.

The operation of the disclosed embodiment of the invention will now be explained. Referring to FIG. 6, there is shown a hollow metal door 40 to which a dead bolt latch (not shown) is to be installed. The door 40 comprises two parallel disposed panels 41, 43, and an edge panel 46. Panels 41 and 46 are normally formed from one piece of sheet material, forming a folded edge 45 at the juncture of the two panels. Panels 43 and 46 are normally joined by a seamed edge 47, as best shown in FIGS. 8 and 12. Door 40 is prepared by drilling aligned holes 42 in panels 41, 43 respectively large enough to accommodate the barrel mechanism of a standard dead bolt latch. Under ordinary circumstances, holes 42 will be approximately one and one half inches in diameter. A third hole 44 is drilled in the edge 46 of door 40 adjacent holes 42. Hole 44 is drilled large enough to accommodate an ordinary dead bolt as it extends and retracts from a dead bolt latch mechanism. Preferably, hole 44 will be approximately one inch in diameter.

The hollow metal door 40 is further prepared for operation of the device of the present invention by removing the standard entry lockset from the door, which leaves a large opening 48 beneath holes 42. Ordinary dead bolt latches are installed approximately five inches above the entry lockset, whereby the axial distance between holes 42 and 48 will be approximately three inches.

Figure 7:
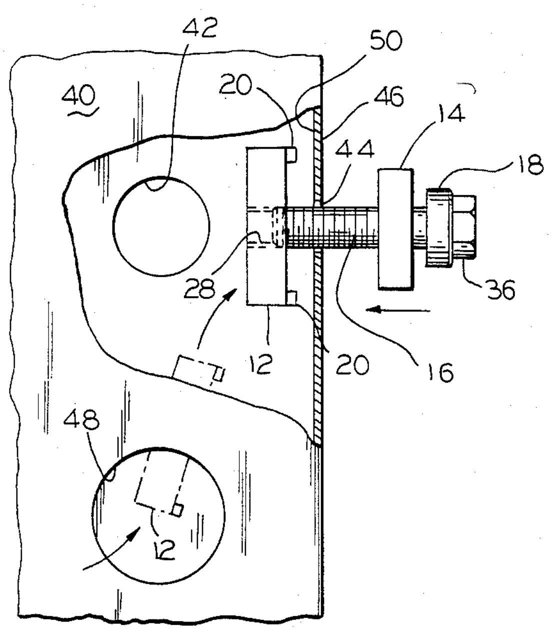
FIG. 7 illustrates the initial steps in using the hollow metal door mortiser of the present invention, showing in particular the positioning of the die block element inside the hollow metal door.
Figure 9:
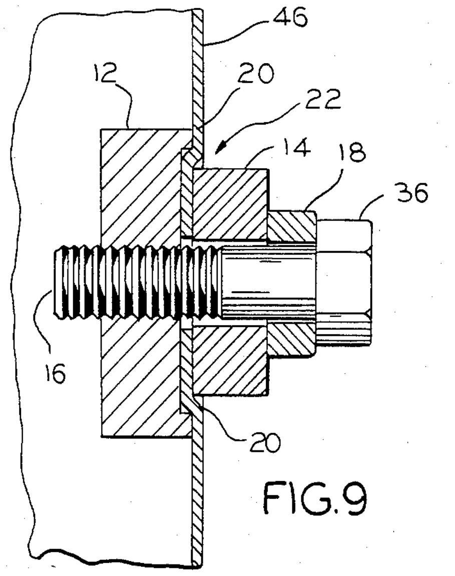
FIG. 9 is a partial cross-sectional view of the hollow metal door with the mortiser of the present invention in place and a mortise formed in the edge of the door.

The next step in the operation of the mortiser of the present invention is to remove die block 12 from threads 34 of bolt 16. Die block 12 is then inserted manually through hole 48 (FIG. 7) and raised into position adjacent hole 44 in door edge 46, whereby threaded aperture is adjacent hole 44 in the edge 46 of door 40. Die block 12 is also positioned such that raised edges 20 abut the inside surface 50 of door edge 46 (FIGS. 7, 9). Protuberances 26 on die block 12 are used as spacers to locate die block 12 laterally whereby aperture 28 maintains its location in the center of door edge 46. The protuberances 26 are disposed against the folded side 45 of door 40, and not the seamed side of the door 47 (FIGS. 8 and 12), to obtain the requisite centering accuracy.

While holding die block 12 in position with aperture 28 aligned with hole 44, pressure application bolt 16 is inserted through hole 44 and threaded by hand or other means into aperture 28 by rotating bolt 16. Prior to threading bolt 16 into aperture 28 of die block 12, mortising block 14 and thrust bearing 18 are disposed on bolt 16 in the relative positions illustrated in FIG. 7. Pressure application bolt 16 is initially hand tightened into aperture 28 whereby mortising block 14 is in abutment with door edge 46, and thrust bearing 18 is positioned against mortising block 14 and head 36 of bolt 16. While tightening bolt 16, die block 12 is held firmly such that protuberances 26 are against the side of door 40. This maintains the alignment of die block 12 relative to hole 44.

Figure 10:
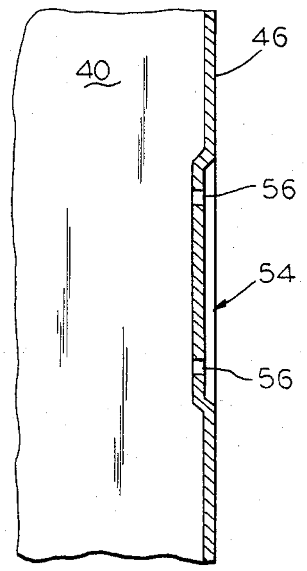
FIG. 10 is a view similar to FIG. 9 showing the mortise formed in the edge of the door and the mortising tool removed.

Next, to form the mortise in edge 46 of door 40, a wrench 52 (FIG. 8) or similar device is used to grip head 36 of bolt 16, and tighten bolt 16 further into aperture 28 of die block 12. As mortising block 14 is pressed into cavity 22 formed between raised edges 20 of die block 12, the sheet metal forming door edge 46 is forced into cavity 22 and a mortised offset in door edge 46 is formed (FIGS. 9, 10). The thrust bearing 18 permits mortising block 14 to be readily pressed into cavity 22 without exerting excessive pressure.

Figure 11:
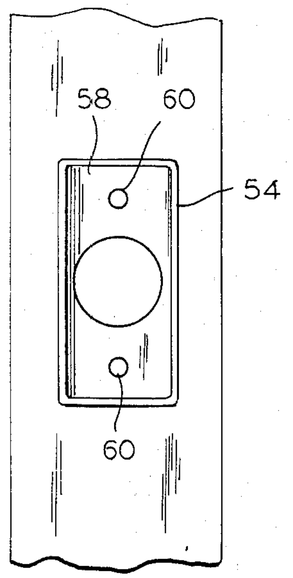
FIG. 11 is a partial view of the edge of the door showing a face plate for a dead bolt latch positioned in the mortise formed by the present invention.

Mortising tool 10 is next removed from door 40 by rotating pressure application bolt 16 such that bolt 16 is withdrawn from die block 12, while mortising block 14 and thrust bearing 18 remain on the shank 32 of bolt 16. While bolt 16 is being removed from aperture 28, the operator's fingers are inserted through hole 48, and die block 12 is manually removed from the interior of door 40 as bolt 16 is removed from aperture 28. The finished mortised door edge 54 with mortising tool 10 removed is shown in section in FIG. 10. Two holes 56 are next drilled through the mortised portion 54 of door 40. Face plate 48 (FIG. 11) is next mounted on mortised portion 54 by means of a pair of screws 60 inserted through face plate 58 and holes 56. Face plate 58 fits flush with the outer surface of door edge 46, since mortised portion 54 has an offset substantially equal to the thickness of face plate 58. The door 40 is now prepared for installation of the dead bolt latch in holes 42 and 44.

If desired, a small hole can be drilled in die block 12 for attachment of a string or wire which can be held onto by the operator to prevent the die block from accidently falling inside the door outside of finger reach. Since most hollow metal doors include a strap inside of the door around the standard lockset, which strap extends laterally from one side of the door to the other, there is little chance that the die block will fall out of finger reach.

It will be apparent from the foregoing description that the hollow metal door mortiser and method of using same embodied in the present invention provide a number of advantages, some of which have been described above, and others of which are inherent in the invention.

Also, it will be apparent that modifications can be made to the apparatus and method of the present invention without departing from the teachings of the present invention. Accordingly, the scope of the invention is only to be limited as necessitated by the accompanying claims.

I claim:

1. A mortiser for applying a mortise to the edge of a hollow metal door comprising: a die block adapted to be positioned inside of said door edge at a point adjacent where a mortise is to be formed in said door edge, a cavity in said die block, mortising block means operatively connected to said die block by pressure application means, said mortising block means disposed on the outer side of said door edge adjacent said die block whereby a portion of said door edge extends between said die block and said mortising block, said pressure application means extending between said die block and said mortising block through an aperture in said door edge, said pressure application means including a threaded bolt mating with a threaded aperture in said die block, said mortising block having an aperture therein, said bolt passing through said aperture in said mortising block whereby said mortising block is freely mounted on said threaded bolt, head means on said bolt extending beyond the aperture in said mortising block whereby rotation of said threaded bolt into said die block causes said head of said threaded bolt to move said mortising block and said portion of said door edges into said cavity in said die block and create an offset in said door edge.

2. The mortiser of claim 1 wherein said die block includes a pair of raised edges on either side of one surface of said die block, whereby said cavity is bounded by said raised edges and said surface of said die block.

3. The mortiser of claim 1 wherein said mortising block has a longitudinal dimension which is slightly less than the interior distance between said raised edges of said die block.

4. The mortiser of claim 1 including thrust bearing means freely mounted on said threaded bolt between said head of said bolt and said mortising block.

5. The mortiser of claim 1 wherein said die block includes laterally extending protuberances for abutting one side of said hollow metal door and aligning said die block in the center of said door edge.

6. A mortiser including die block means having a cavity therein, a pair of raised edges on either side of one surface of said die block, said cavity extending between said raised edges of said die block, a threaded aperture formed in said die block, threaded pressure application bolt means mating with the threads in said threaded aperture of said die block, mortise block means freely mounted on said threaded pressure application bolt, said mortise block means having an aperture therethrough whereby said threaded bolt pressure means extends through said aperture in said mortiser block means, said threaded pressure application bolt means including a head thereon, said head having a diameter larger than said aperture in said mortising block, whereby rotation of said threaded pressure application bolt means presses said mortising block into said cavity of said die block.

7. The mortiser of claim 6 including thrust bearing means disposed between said head of said threaded pressure application bolt means and said mortising block.

8. The method of applying a rectangular mortise to the edge panel of a hollow metal door having two spaced apart parallel panels adjacent said edge panel, said hollow door comprising an opening therein for location of an entry lockset, an entry lockset mounted in said opening in said hollow metal door, the method comprising the steps of:

forming a first hole in the door edge at the location where said mortise is to be formed;

forming second and third holes in said two spaced apart parallel panels adjacent said first hole;

removing said entry lockset from said door;

inserting a die block having a threaded aperture and a cavity in one face thereof through the opening from which said entry lockset was removed;

positioning said die block in said door behind said first hole whereby said door edge adjacent said first hole is positioned over said cavity in said die block;

inserting pressure application means through said first hole and operably connecting said pressure application means to said die block, said pressure application means including mortising block means extending along the portion of said door edge where said mortise is to be applied, and a threaded bolt extending through said mortising block means and into said threaded aperture of said die block;

applying pressure to said mortising block by means of said pressure application means whereby said mortising block and said portion of said door edge extending along said mortising block are pressed into said cavity of said die block, whereby an offset is formed in said door edge;

removing said threaded bolt from said threaded aperture after formation of said offset in said door edge;

removing said die block from inside said door; and applying a face plate to the offset portion of said door edge.

9. The method of claim 8 wherein said cavity in said die block is formed by spaced apart raised edges on said die block and the surface of said die block extending between said raised edges.

10. The method of claim 8 whereby the step of positioning said die block in said door includes the additional step of locating said die block laterally adjacent one of said spaced apart door panels and adjacent said first hole by means of locating lateral protuberances on said die block against one corner of said hollow door.

* * * * *